United States Patent

Re. 28,348
Reissued Feb. 25, 1975

28,348

PROCESS FOR PRODUCING SILICON OXYNITRIDE

Malcolm E. Washburn, Princeton, Mass., assignor to Norton Company, Worcester, Mass.

No Drawing. Original No. 3,639,101, dated Feb. 1, 1972, Ser. No. 50,939, June 29, 1970. Application for reissue Jan. 18, 1973, Ser. No. 324,831
Int. Cl. C01b *21/06*
U.S. Cl. 423—325 7 Claims

Matter enclosed in heavy brackets [ ] appears in the original patent but forms no part of this reissue specification; matter printed in italics indicates the additions made by reissue.

ABSTRACT OF THE DISCLOSURE

The production of silicon oxynitride bodies from solid reaction mixes of silicon and silica is facilitated, in terms of strength of product and dimensional stability by controlling the amount of gaseous nitrogen available during reaction. The maximum reaction rate, which can be controlled by control of the partial pressure of nitrogen, can vary from 26 percent per hour for loads of 10,000 pounds. Argon has been found particularly useful to control the reaction.

U.S. Pat. No. 3,356,513 on the production of silicon oxynitride teaches that silicon oxynitride can be made by mixing finely divided silicon metal with finely divided silica in various ratios of 47.5 to 98 parts of silicon to 1 to 50 parts of silica, adding a promoter such as an alkaline earth oxide, and firing in an atmosphere of nitrogen and oxygen in which the ratio of oxygen to nitrogen is from 1 to 99 to 6 to 94 parts by volume.

The reaction that takes place is essentially as follows:

$$(4-x)Si+xSiO_2+(1-x)O_2+2N\rightarrow 2Si_2ON_2 \qquad (1)$$

where x varies between 0 and 1 and is the number of moles of $SiO_2$ which are converted to $Si_2ON_2$. The value of x is dependent in many factors including composition, particle size, availability of $O_2$, temperature, homogeneity, etc.

This reaction is exothermic. Heat generated internally in a large mass can raise the temperature of the mass above the melting point of silicon, which in turn drastically reduces the rate of reaction. I have found that rapid temperature rise from an uncontrolled exothermic reaction also results in excessive growth, and causes bad swelling and cracking to occur in molded products. Such product is very weak and can even be crumbly in severe cases.

I have discovered that the exothermic reaction can be controlled by replacing the nitrogen and oxygen by an inert gas such as helium or argon for short intervals of time in the reaction chamber and then admit a relatively small quantity of gaseous reactants back into the chamber, thereby allowing only a small amount of reaction to proceed during the critical phases of the reaction. The amount of inert gas required to suffocate the reaction is small and enough to fill the reaction chamber is all that is needed to stop the reaction. During the period of suffocation, the inert gas performs two functions. First, it restricts the quantity of available gaseous reactants and second, it lowers the temperature at the reaction site where a particle of silicon is in intimate contact with a particle of silica. To allow the reaction to resume, the gaseous reactants may be administered slowly, partially replacing the inert gas which may be leaked off through an outlet in the chamber. In this manner, the reaction may proceed only to the extent allowed by the amount of gaseous reactant that is available. This amount is equal to the partial pressure of the gaseous reactant.

I have found that both helium and argon can be used as the inert gas to control the partial pressures of the gaseous reactants. A partial vacuum can also be used to restrict the availability of the gaseous reactants as well, but a vacuum tight system is required. The preferred gas is argon. Argon, because of its larger atomic size, has a greater suffocating effect and larger heat capacity on a volume basis. The mean free path of contaminating gases through accidental leakage in the reaction chamber is shorter with argon than with helium or a vacuum. All three methods of partial pressure control or combinations of them can be used, however, if proper precaution against leakage is taken. Examiples are given for an on-off type of operation, i.e., a complete replacement of the gaseous reactants by inert gas followed by a complete replacement of the reactants. During the interval of injection or reactant back into inert gas, however, the reaction has been found in practice to proceed smoothly at a controlled low level with a mixture of the two gases until complete replacement is achieved. Thus, the reaction can be controlled by maintaining a proportional mixture of reactant and inert gas with controlled leakage and constant pressure, thereby, resulting in a more constant rate of reaction.

In practice, I have found that the rate of flow of nitrogen into the chamber is a direct indication of the rate at which the reaction is taking place. If the weight of green product is known, then the nitrogen required can be calculated. According to reaction (2), theoretically complete reaction will result in a 39 percent weight gain. Since all the oxygen is in solid form, this weight gain is equal to the amount of nitrogen consumed. The handbook value for the weight of nitrogen shows that, at standard conditions, nitrogen weighs 0.078 No./cu. ft. The flow rate of nitrogen can be calculated as the weight and also as the precent required for theoretical completion. This value is referred to as the rate of reaction.

Leakage of the chamber can be determined before the reaction starts and this can be subtracted from the flow rate to determine the actual nitrogen consumption.

The speed at which the reaction is proceeding can be determined by the slope of the nitrogen input curve and can be determined as the change in rate of reaction as percent/hour/hour. This value can be used to judge when the reaction is proceeding too fast and may be used to control the reaction. Conventional automatic control equipment, sensing the change in nitrogen flow can be employed for automatic control of the reaction.

The best control, however, is the rate of reaction as determined by the flow rate. By allowing the rate to increase to a maximum point and then controlling the partial pressure by adding argon, for example, the exothermic effects can be brought under control easily. This can be repeated as many times as necessary until the reaction rate has stabilized.

I have found that the maximum rate of reaction can be higher for a smaller reaction chamber with less of a mass of green product. With a mass of green product of 50 to 100 pounds in a 3.6 cubic foot chamber as cited in Example I, the reaction rate may be 16 percent/hour with good results. If, however, the reaction rate is as high as 25 percent/hour, poor product results with excessive growth of product.

It is estimated that for small chambers with quantities of material of 10 pounds of green product, the maximum rate of reaction can be as high as 26 percent/hour. Proportionally larger chambers with quantities as high as 10,000 pounds would require a low maximum rate of reaction of about 3 percent/hour.

Stabilization of the reaction is reached when the "turn around" point occurs. At this point, the change in the rate of reaction or the slope of nitrogen input curve is zero.

The argon may then be turned off and the reaction brought to completion as fast as possible.

Such point can be observed manually or can be automatically sensed. Prior to the "turn around" point the maximum reaction rate, as noted above is dependent upon the furnace charge. The maximum rate, plus or minus 10 percent can be expressed by the equation:

$$R=53.118/w^{0.308}$$

where R is the reaction rate in percent per hour and w is the furnace charge in pounds. The precise maximum rate will be influenced somewhat by geometry and size of individual pieces of the charge but, in any case will be within 10 percent of that predicted by the equation given above. In the case of manual control, the operator can quench the reaction by admission of argon, for example, and cutoff of nitrogen, when the rate approaches the maximum, and then readmit nitrogen periodically until the "turn around" is reached, at which point nitrogen can be freely admitted without further control. In the case of automatic control the maximum reaction rate will be programmed into the controller, and control can be continuous.

The amount of reaction that has occurred may be determined at any time during the firing cycle by integrating the area under the nitrogen input curve. This can show when the reaction reaches 100 percent completion and the furnace may be turned off at this point.

In practice, it has been found that a fairly long period of time is necessary for complete reaction to occur. The reaction proceeds rapidly up to the "turn-around" point and needs to be controlled, but the reaction is slow after the reaction has stabilized at that point. I believe that the reaction, up to that point involves a fast solid state reaction between the silicon particles and the silica particles. After the "turn-around" point, the reaction is one of nitrogen diffusion into the structure of the shaped piece. Low permeability and thick cross sections would require longer times than high permeability and thin sections. It is essential that all of the raw materials be reacted since unreacted silicon or silica is detrimental to the nonwetting and nonpenetration with fused salt characteristics of silicon oxynitride.

Reaction (1) indicates that some gaseous oxygen is required for the reaction to form silicon oxynitride. I have subsequently found in work later than that described in U.S. Pat. No. 3,356,513 that the reaction may proceed directly without gaseous oxygen as follows:

$$3Si+SiO_2+2N_2 \rightarrow 2Si_2ON_2 \qquad (2)$$

In this case, all of the required oxygen is contained in the solid state of silica and no external source of oxygen is needed. It has been found that rates of reaction involving oxygen are considerably faster than rates of reaction involving nitrogen, and in a large mass, oxygen in a $N_2$, $O_2$ mixture reacts with silicon near the inlet tube leaving only the nitrogen of the mixture available for the mass away from the inlet tube. This situation also occurs in thick-shaped pieces of solid reactants. Oxygen preferentially reacts with the silicon on the surface and leaves only nitrogen for the reaction in the core of the mass. By adding all the oxygen required in the solid form of silica, these effects can be avoided and better consistency of reaction throughout the mass can be achieved.

My discovery is that a very major improvement in the formation of silicon oxynitride refractory items can be made by not introducing oxygen in the reaction chamber as was previously thought and described in U.S. Pat. No. 3,356,513. Product of excellent consistency and large masses of product can be made by adding all of the oxygen in the solid form of silica in the stoichiometric amount shown in reaction (2). In previous practice, it was believed that some gaseous oxygen was necessary in order for the reaction to proceed and was intentionally added to the chamber in specified amounts. I now find that this practice can actually be detrimental in that silicon in green bodies oxidizes at the surface and results in an impurity formation of silica. Silicon oxynitride exhibits unusual nonwetting characteristics with molten fused salts and glass. The presence of silica at the surface spoils this desired effect.

My invention is in two parts. I have discovered that substantially improved silicon oxynitride refractory shapes can be made by controlling the furnace in such a manner that the exothermic reaction is controlled. Such refractory shapes are free of cracks due to swelling and free of unreacted silicon due to melting. They are superior to product made by my previous practice. Large shapes and large masses can also be made which were previously extremely difficult to produce and control.

I have also discovered that no oxygen need be introduced to form $Si_2ON_2$ but all oxygen in the formula can be added in a solid form as silica. Refractory shapes made by this technique are more consistent than previous product and maintain desired characteristics of silicon oxynitride such as nonwetting by glass or penetration by fused salts more readily than product made by my previous practice.

Examples are given to show these improvements.

EXAMPLE I

| | Run A (LHON #5)[a] | Run B LHON #13)[b] |
|---|---|---|
| Inert gas control | (c) | (d) |
| Number of control cycles | 0 | 4 |
| Size of chamber, cu. ft | 3.6 | 3.6 |
| Weight of product (less green binders), pounds | 71 | 54 |
| Nitrogen required (39%=theoretical) pounds | 27.6 | 21.1 |
| Nitrogen required (÷.078#/cu. ft.), cu. ft | 354 | 270 |
| Base leak rate of chamber, cu. ft./hr | 30 | 7 |
| Maximum flow rate, cu. ft./hr | 119 | 49 |
| Maximum $N_2$ consumption, cu. ft./hr | 89 | 42 |
| Maximum rate of reaction, percent/hour | 25.2 | 15.6 |
| Maximum change of $N_2$ consumption, cu. ft./hr.$^2$ | 129 | 132 |
| Maximum change of $N_2$ rate of reaction, percent/hour $^2$ | 36 | 49 |
| Test Bar #[e] | 33-6-10b | 160-6-101 |
| Density of test bar, g./cc | 1.82 | 1.98 |
| Vinear growth of test bar, percent | 2.3 | .7 |
| Modulus of rupture, p.s.i | 2,711 | 6,710 |

NOTE.—Description: [a] Bar showed excessive growth with cracks, warpage, and weak structure with some unreacted silicon; [b] Bar was fairly straight with no cracks and strong structure.

[c] No helium injection.

[d] Helium injection.

[e] Both test bars were made with the same formulation of 59 parts by weight of −200 mesh silicon, 40 parts of fused silica, 1 part CaO and both were isostatically pressed at 10, 00 p.s.i.

EXAMPLE II

Inert gas control, Argon injection.

| | |
|---|---|
| Number of control cycles | 7 |
| Size of chamber, cu. ft. | 40 |
| Weight of product (less green binder), lbs. | 727 |
| Nitrogen required, lbs. | 278 |
| Nitrogen required (÷.078#/cu. ft.), cu. ft. | 3,570 |
| Base leak rate of chamber, cu. ft. | 5 |

| Cycle number | 1 | 2 | 3 | 4 | 5 | 6 | 7 | Turn-around point |
|---|---|---|---|---|---|---|---|---|
| Maximum flow rate (c.f.h.) | 100 | 120 | 150 | 100 | 235 | 240 | 240 | 270 |
| Maximum consumption (c.f.h.) | 95 | 115 | 145 | 185 | 230 | 235 | 235 | 265 |
| Maximum rate or reaction (percent/hour) | 2.7 | 3.2 | 4.1 | 5.2 | 6.4 | 6.6 | 6.6 | 7.4 |
| Change of $N_2$ consumption at maximum rate of reaction (cu. ft./hr.$^2$) | 120 | 80 | 40 | 24 | 210 | 120 | 120 | 0 |
| Change of reaction rate at maximum rate of reaction (percent/hour.$^2$) | 3.4 | 2.2 | 1.1 | .7 | 5.9 | 3.4 | 3.4 | 0 |

Analysis of plate (12 x 11 x ¾ inch):

| | Percent |
|---|---|
| $Si_2ON_2$ | 75.8 |
| Alpha $Si_3N_4$ | 11.0 |
| Beta $Si_3N_4$ | 3.8 |
| Cristobalite | 9 |
| Silicon | 0 |
| Silicon Carbide | 0 |

Example III shows that all of the oxygen required to form oxynitride can be added in a solid form such as fused silica. In the raw bath, all of the required oxygen is added in the 40 parts by weight of fused silica. The analysis of the bar, however, shows that no cristobalite is found indicating that the silica was consumed in the reaction to form silicon oxynitride.

EXAMPLE III

A test bar was made as follows;

A raw batch of the following was mixed:

| | Parts by weight |
|---|---|
| —250-mesh silicon | 59 |
| —200-mesh fused silica | 40 |
| CaO | 1 |
| Carbowax 4000 | 12 |

A test bar, 8½ x 2 x ¾ inch, was isostatically pressed at 20,000 p.s.i. and the bar was fired in Run B of Example I. The fired density was 2.01 g./cc. and the modulus of rupture at room temperature was 8,900 p.s.i. The analysis of the bar was calculated from nitrogen analysis and X-ray data and found to be as follows:

| | Percent |
|---|---|
| $Si_2ON_2$ | 74.2 |
| Alpha $Si_3N_4$ | 7.6 |
| Beta $Si_3N_4$ | 8.2 |
| Cristobalite | 0 |
| Silicon | 0 |
| Silicon Carbide | 8 |

In the above examples the furnace was either electrically heated, or gas fired, with the products of combustion sealed out of the reaction chamber for the gas fired kiln. The parts are gradually heated to burn off organic binders and the reaction begins at between 1,100° and 1,200° C.

What is claimed is:

1. In a method whereby $Si_2ON_2$ is produced from a reaction mix including a source of Si, a source of N and a source of O, the improvement consisting of maintaining the reaction rate below R percent per hour, where $R=53.118/w^{0.308}$ and w is the furnace charge in pounds by [control of] *measuring said rate and controlling* the amount of gaseous nitrogen available to the reaction *in accordance with the measured rate.*

2. A method as in claim 1 in which the reaction rate is controlled by intermittent admission of nitrogen gas to the reaction chamber.

3. A method as in claim 1 in which the reaction rate is controlled by maintaining the partial pressure of nitrogen at a level such that the reaction rate does not exceed R.

4. A method as in claim 1 in which the source of silicon is elemental silicon and $SiO_2$, the source of oxygen is $SiO_2$, and the source of nitrogen is $N_2$ gas in the furnace atmosphere.

5. A method as in claim 1 wherein the control of nitrogen is established by the use of argon as a displacing medium.

*6. In a method wherein silicon is exothermically reacted with nitrogen and oxygen in a heated reaction zone to produce a compound containing silicon, oxygen and nitrogen, selected from the class consisting of silicon oxynitride and alpha silicon nitride, the improvement which comprises measuring the rate of reaction by measuring the flow rate of nitrogen into said zone, decreasing the flow of nitrogen into said zone when the reaction rate, as measured by said flow rate, exceeds a predetermined rate, introducing an inert gas into said reaction zone when said nitrogen flow is decreased, increasing the nitrogen flow into said zone after a predetermined time interval, continuing said cycling (of nitrogen and inert gas) until the rate of increase of flow of nitrogen into said zone falls to zero, and continuing introduction of nitrogen until substantially all of said silicon is reacted.*

*7. The method of claim 6 wherein the nitrogen flow is substantially shut off when said predetermined rate is exceeded.*

References Cited

The following references, cited by the Examiner, are of record in the patented file of this patent or the original patent.

UNITED STATES PATENTS

| | | | |
|---|---|---|---|
| 2,968,530 | 1/1961 | Forgeng et al. | 423—325 |
| 3,193,399 | 7/1965 | Washburn | 423—325 X |
| 3,356,513 | 12/1967 | Washburn | 423—325 X |

EARL C. THOMAS, Primary Examiner

U.S. Cl. X.R.

106—55

UNITED STATES PATENT OFFICE

CERTIFICATE OF CORRECTION

PATENT NO. : Re.28,348

DATED : February 25, 1975

INVENTOR(S) : Malcolm E. Washburn

It is certified that error appears in the above-identified patent and that said Letters Patent are hereby corrected as shown below:

In the abstract: line 7, after "for" - furnace loads of 10 pounds, to 3 percent per hour for - should be inserted.

Columns 1, line 37: "$(4-x)Si+xSiO_2+(1-x)O_2+2N-\ 2Si_2ON_2$ (1)" should read - $(4-x)Si+xSiO_2+(1-x)O_2+2N_2-\ 2Si_2ON_2$ (1) -

Columns 4, Example 1, next to last line: "Vinear" should read - Linear -

Signed and Sealed this

*fifth* Day of *August 1975*

[SEAL]

*Attest:*

RUTH C. MASON
*Attesting Officer*

C. MARSHALL DANN
*Commissioner of Patents and Trademarks*